US008452096B2

(12) United States Patent
Doretto et al.

(10) Patent No.: US 8,452,096 B2
(45) Date of Patent: May 28, 2013

(54) IDENTIFYING DESCRIPTOR FOR PERSON OR OBJECT IN AN IMAGE

(75) Inventors: Gianfranco Doretto, Albany, NY (US); Xiaogang Wang, Cambridge, MA (US); Thomas B. Sebastian, Flemington, NJ (US); Jens Rittscher, Ballston Lake, NY (US); Peter H. Tu, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/431,198

(22) Filed: Mar. 27, 2012

(65) Prior Publication Data
US 2012/0183212 A1    Jul. 19, 2012

Related U.S. Application Data

(62) Division of application No. 11/987,777, filed on Dec. 4, 2007, now Pat. No. 8,165,397.

(60) Provisional application No. 60/960,545, filed on Oct. 3, 2007, provisional application No. 60/868,407, filed on Dec. 4, 2006.

(51) Int. Cl.
*G06K 9/00* (2006.01)
(52) U.S. Cl.
USPC .......................................................... 382/181
(58) Field of Classification Search
USPC .......................................... 382/181, 191, 231
See application file for complete search history.

(56) References Cited

U.S. PATENT DOCUMENTS

| 6,535,620 | B2 | 3/2003 | Wildes et al. |
| 7,574,037 | B2 | 8/2009 | Hidai et al. |
| 2003/0219146 | A1 | 11/2003 | Jepson et al. |
| 2004/0228503 | A1 | 11/2004 | Cutler |
| 2005/0102246 | A1 | 5/2005 | Movellan et al. |
| 2006/0072811 | A1 | 4/2006 | Porter et al. |
| 2006/0177131 | A1 | 8/2006 | Porikli |

OTHER PUBLICATIONS

Ahonen et al, "Face recognition based on the appearance of local regions", Aug. 2004, ICPR, vol. 3, pp. 153-156.*
S. Belongie, J. Malik, and J. Puzicha. Shape matching and object recognition using shape contexts. *IEEE TPAMI*, 24:509-522, 2002.
N. Dalai and B. Triggs. Histograms of oriented gradients for human detection. In *CVPR*, vol. 1, pp. 886-893, Jun. 20-25, 2005.

(Continued)

*Primary Examiner* — Edward Park
(74) *Attorney, Agent, or Firm* — Oblon, Spivak, McClelland, Maier & Neustadt, L.L.P.

(57) ABSTRACT

A device and method for processing an image to create appearance and shape labeled images of a person or object captured within the image. The appearance and shape labeled images are unique properties of the person or object and can be used to re-identify the person or object in subsequent images. The appearance labeled image is an aggregate of pre-stored appearance labels that are assigned to image segments of the image based on calculated appearance attributes of each image segment. The shape labeled image is an aggregate of pre-stored shape labels that are assigned to image segments of the image based on calculated shape attributes of each image segment. An identifying descriptor of the person or object can be computed based on both the appearance labeled image and the shape labeled image. The descriptor can be compared with other descriptors of later captured images to re-identify a person or object.

8 Claims, 13 Drawing Sheets

APPEARANCE LABELED IMAGE

OTHER PUBLICATIONS

G. Doretto, X. Wang, T.B. Sebastian, J. Rittscher, and P. Tu. Shape and appearance context modeling: A fast framework for matching the appearance of people. Technical Report 2007GRC594, GE Global Research, Niskayuna, NY, USA, 2007.

L. Fei-Fei and P. Perona. A Bayesian hierarchical model for learning natural scene categories. In *CVPR*, vol. 2, pp. 524-531, Jun. 20-25, 2005.

B.V. Funt and G. D. Finlayson. Color constant color indexing. *IEEE TPAMI*, 17:522-529, 1995.

N. Gheissari, T. B. Sebastian, P. H. Tu, J. Rittscher, and R. Hartley. Person reidentification using spatiotemporal appearance. In *CVPR*, vol. 2, pp. 1528-1535, 2006.

Y. Guo, S. Hsu, Y. Shan, H. Sawhney, and R. Kumar, Vehicle fingerprinting for reacquisition & tracking in videos. In *CVPR*, vol. 2, pp. 761-768, Jun. 20-25, 2005.

J. Huang, S. R. Kumar, M. Mitra, W.-J. Zhu, and R. Zabih. Image indexing using color correlograms. In *CVPR*, pp. 762-768, San Juan, Jun. 17-19, 1997.

O. Javed, K. Shafique, and M. Shah. Appearance modeling for tracking in multiple non-overlapping cameras, In *CVPR*, vol. 2, pp. 25-33, Jun. 20-25, 2005.

S. Kumar and M. Hebert. Discriminative random fields. *IJCV*, 68:179-201, 2006.

S. Lazebnik, C. Schmid, and J. Ponce. Affine-invariant local descriptors and neighborhood statistics for texture recognition. In *ICCV*, pp. 649-655, 2003.

D. Lowe. Distinctive image features from scale-invariant key points. *IJCV*, 60:91-110, 2004.

X. Ma and W.E. L. Grimson. Edge-based rich representation for vehicle classification. In *CVPR*, vol. 2, pp. 1185-1192, Oct. 17-21, 2005.

K. Mikolajczyk and C. Schmid. A performance evaluation of local descriptors. *IEEE TPAMI*, 27:1615-1630, 2005.

H. Moon and P. J. Phillips. Computational and performance aspects of PCA-based face-recognition algorithms. *Perception*, 30(3):3003-321, 2001.

G. Mori and J. Malik. Recovering 3d human body configurations using shape contexts. *IEEE TPAMI*, 28(7):1052-1062, Jul. 2006.

O. C. Ozcanli, A. Tamrakar, B. B. Kimia, and J. L. Mundy. Augmenting shape with appearance in vehicle category recognition. In *CVPR*, vol. 1, pp. 935-942, New York, NY, USA, 2006.

F. Porikli. Integral histogram: a fast way to extract histograms in cartesian spaces. In *CVPR*, vol. 1, pp. 829-836, Jun. 20-25, 2005.

S. Savarese, J. Winn, and A. Criminisi. Discriminative object class models of appearance and shape by correlations. In *CVPR*, vol. 2, pp. 2033-2040, 2006.

B. Schiele and J. L. Crowley. Recognition without correspondence using multidimensional receptive field histograms. *IJCV*, 36(1):31-50, 2000.

J. Shotton, J. Winn, C. Rother, and A. Criminisi. Textonboost: Joint appearance, shape and context modeling for multi-class object recognition and segmentation. In *ECCV*, pp. 1-15, 2006.

O. Tuzel, F. Porikli, and P. Meer, Region covariance: A fast descriptor for detection and classification. In *ECCV*, pp. 589-600, 2006.

M. Varma and A. Zisserman. A statistical approach to texture classification from single images. *IJCV*, 62:61-81, 2005.

A. Vedaldi and S. Soatto. Local features, all grown up. In *CVPR*, vol. 2, pp. 1753-1760, 2006.

P. Viola and M. J. Jones. Robust real-time face detection. *IJCV*, 57:137-154, 2004.

J. Winn, A. Criminisi, and T. Minka. Object catergorization by learned universal visual dictionary. In *ICCV*, vol. 2, pp. 1800-1807, Oct. 17-21, 2005.

L. Wolf and S. Bileschi. A critical view of context. *IJCV*, 69(2):251-261, Aug. 2006.

Q. Zhao and H. Tao. Object tracking using color correlogram. In *VS-PETS*, pp. 263-270, Oct. 15-16, 2005.

Hahnel et al., "Color and texture features for person recognition", 7/04, IEEE, pp. 647-652.

Iqbal et al., "Combining structure, color and texture for image retrieval: a performance evaluation", Pattern recognition, 12/02, vol. 2, pp. 438-443.

Zhu et al., "Fast Human Detection Using a cascade of histograms of oriented gradients", IEEE, 10/06, pp. 1491-1498.

Aug. 19, 2011 Office Action issued in U.S. Appl. No. 11/987,785.

Meylan, L., et al., "High Dynamic Range Image Rendering With a Retinex-Based Adaptive Filter," IEEE Transactions on Image Processing, vol. 15, Issue 9, Sep. 2006, pp. 2820-2830.

Jun. 1, 2009 Office Action issued in U.S. Appl. No. 11/478,049.

Dec. 31, 2009 Notice of Allowance issued in U.S. Appl. No. 11/478,049.

Jan. 24, 2012 Notice of Allowance issued in U.S. Appl. No. 11/987,785.

Sep. 24, 2012 Office Action issued in U.S. Appl. No. 13/430,413.

Amit et al., "Graphical Templates for Model Registration," IEEE Transactions on Pattern Analysis and Machine Intelligence, vol. 18, No. 3, Mar. 1996, pp. 225-236.

Felzenszwalb et al., "Efficient Graph-Based Image Segmentation," International Journal on Computer Vision, vol. 59, No. 2, 2004, pp. 1-26.

Felzenszwalb, "Representation and Detection of Deformable Shapes," IEEE Transactions on Pattern Analysis and Machine Intelligence, vol. 27, No. 2, Feb. 2005, pp. 208-220.

Hsu, et al., "Face Detection in Color Images," IEEE Transactions on Pattern Analysis and Machine Intelligence," vol. 24, No. 5, May 2002, pp. 696-706.

Javed et al., "Tracking Across Multiple Cameras With Disjoint Views," Proceedings of the Ninth IEEE International Conference on Computer Vision (ICCV '03), 2003, pp. 1-6.

Lowe, "Object Recognition from Local Scale-Invariant Features," Proceedings of the International Conference on Computer Vision, vol. 2, 1999, pp. 1-8.

Mezaris et al., "Video Object Segmentation Using Bayes-Based Temporal Tracking and Trajectory-Based Region Merging," IEEE Transactions on Circuits and Systems for Video Technology, vol. 14, No. 6, pp. 782-795.

Moscheni et al., "Spatiotemporal Segmentation Based on Region Merging," IEEE Transactions on Pattern Analysis and Machine Intelligence, vol. 20, No. 9, Sep. 1998, pp. 897-915.

She et al., "Vehicle Tracking Using On-Line Fusion of Color and Shape Features," 2004 IEEE Intellegent Transportation Systems Conference, Washington, D.C., Oct. 2004, pp. 731-736.

Shoemake et al., "Matrix Animation and Polar Decomposition," Proceedings of Graphics Interface, 1992, pp. 258-264.

Singhal et al., "Probabilistic Spatial Context Models for Scene Content Understanding," Proceedings of the 2003 IEEE Computer Society Conference on Computer Vision and Pattern Recognition (CVPR'03), 2003.

Sivic et al., "Video Google: A Text Retrieval Approach to Object Matching in Videos," Proceedings of the Ninth IEEE International Conference on Computer Vision (ICCV '03), 2003.

Song et al., "Unsupervised Learning of Human Motion," IEEE Transactions on Pattern Analysis and Machine Intelligence, vol. 25, No. 7, Jul. 2003, pp. 814-827.

Vincent et al., "Watersheds in Digital Spaces: An Efficient Algorithm Based on Immersion Simulations," IEEE Transactions on Pattern Analysis and Machine Intelligence, vol. 13, No. 6, Jun. 1991, pp. 583-598.

Wang et al., "Silhouette Analysis-Based Gait Recognition for Human Identification," IEEE Transactions on Pattern Analysis and Machine Intelligence," vol. 25, No. 12, Dec. 2003, pp. 1505-1518.

* cited by examiner

HISTOGRAM OF THE ORIENTED GRADIENTS

IMAGE GRADIENT OF LOCAL PATCH AROUND PIXEL

IMAGE

APPEARANCE LABELED IMAGE

SHAPE LABELED IMAGE

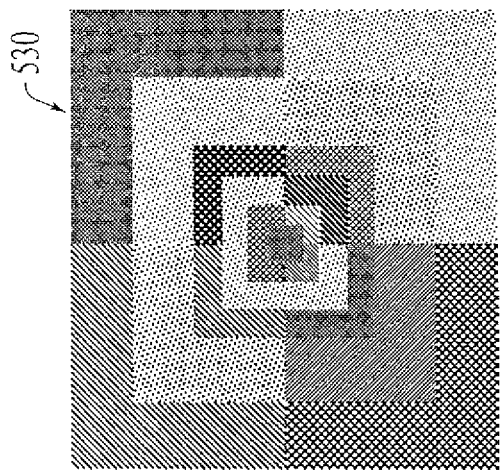
FIG. 8C
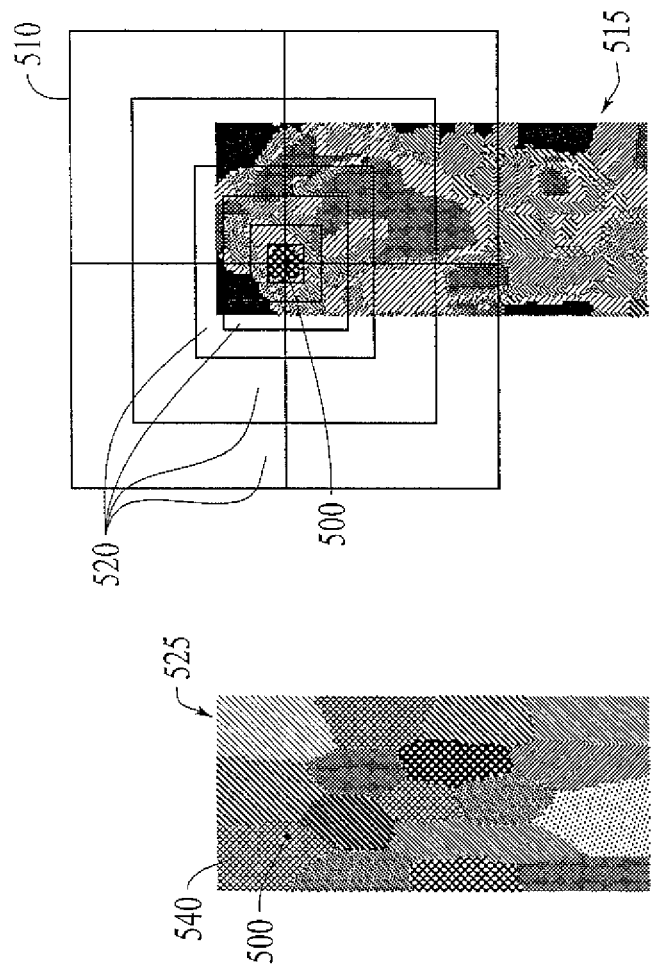
FIG. 8B
FIG. 8A

IDENTIFYING DESCRIPTOR FOR PERSON OR OBJECT IN AN IMAGE

CROSS-REFERENCE TO RELATED APPLICATION

This is a Divisional Application of and claims benefit of application Ser. No. 11/987,777 filed Dec. 4, 2007 now U.S. Pat. No. 8,165,397 which in turn is a Non-Provisional Application, which claims the benefit of U.S. Provisional Application No.60/868,407 filed Dec. 4, 2006 and U.S. Provisional Application No. 60/960,545 filed Oct. 3, 2007. The disclosure of the prior applications is hereby incorporated by reference herein in its entirety. The co-pending application entitled "Fast Computation of Region Based Image Features," application Ser. No. 11/987,785, is incorporated herein by reference in its entirety.

BACKGROUND

The present disclosure relates generally to a device and method for re-identifying a person or object that is included in multiple images.

Re-identification is the ability to identify a previously observed individual or object. A number of applications require the ability to re-identify previously observed people or objects over time and over multiple disjointed views. For example, in many surveillance applications, individuals or objects need to be tracked over a surveillance network encompassing numerous different non-overlapping camera views. Re-identification techniques may also be used in security applications, forensic applications, for the identification of missing people and for tracking people or objects in crowded environments such as mass transit and airports.

SUMMARY

Person or object re-identification may be performed by modeling object appearance to compute the similarity of certain image regions.

Parts-based models for appearance recognition can calculate local descriptors that are either aggregated to form a part and/or are specifically designed to localize a part. Object parts can be subsequently merged within a statistical framework to create an object descriptor. These models are designed to detect parts for object categorization, rather than providing a distinctive descriptor for a specific object within a category.

Other approaches of modeling object appearance seek a global spatial aggregation of local descriptors. In these models, images or portions of images can be represented by a distribution of local descriptors. Relatively invariant signatures that are based on a global appearance of an individual can be created and compared. For example, for person re-identification, a color histogram of the region below the face may serve as a signature or descriptor for subsequent comparison. The person may be re-identified by comparing adjusted color histograms from later captured images.

Additional re-identification models are described in co-pending application Ser. No. 11/478,049 entitled "Method and System for Performing Image Re-identification," filed Jun. 27, 2006, which is incorporated by reference herein in its entirety.

Aspects of this disclosure can provide a device and method enabling re-identification of persons and objects captured within an image that is robust, fast, and delivers a high matching rate.

According to a first aspect of the present disclosure, there can be provided an image processing device for computing an identifying descriptor of an object or person captured within an image. The device can include a pre-processing device that is configured to identify image segments of the image that are included as part of the person or object, an appearance labeling device that is configured to assign appearance labels to the image segments to create an appearance labeled image, a shape labeling device that is configured to assign shape labels to the image segments to create a shape labeled image, and a descriptor determining device that is configured to calculate the identifying descriptor for the person or object based on information from both the appearance labeled image and the shape labeled image.

In another aspect, the present disclosure can provide a method of processing an image including a person or object. The method can include identifying image segments that are included as part of the person or object, calculating an appearance attribute for each of the image segments, creating an appearance labeled image by assigning appearance labels to the image segments based on the calculated appearance attributes, and calculating an identifying descriptor for the person or object in the image where the identifying descriptor captures a spatial relationship among the appearance labels in the appearance labeled image.

In another aspect, the present disclosure can provide a method for processing an image including a person or object, including identifying image segments that are included as part of the person or object from the image, converting data from the image segments into Log-RGB color space, calculating a histogram of the oriented gradients (HOG) based on the Log-RGB color space data, and creating an appearance labeled image by assigning appearance labels to the image segments based on the calculated HOG value of each image segment.

The present disclosure can also provide a system for re-identifying a person or object captured in an image. The system can include an image acquisition device that inputs an image, an image processing device that receives the images input from the image acquisition device, the image processing device including a pre-processing device that is configured to identify image segments that are included as a part of the person or object, an appearance labeling device that is configured to assign appearance labels to the image segments to create an appearance labeled image, a shape labeling device that is configured to assign shape labels to the image segments to create a shape labeled image, and a descriptor determining device that is configured to calculate an identifying descriptor for the person or object based on information from both the appearance labeled image and the shape labeled image. The image processing system can further include a comparing device that is configured to compare the identifying descriptor calculated for the person or object with a previously calculated identifying descriptor.

Thus, the identifying descriptor that is calculated for the person or object can be compared with a previously calculated identifying descriptor that is calculated for a person or object captured within a previously input image to determine whether the identifying descriptor substantially corresponds to the previously calculated identifying descriptor. Accordingly, if it is determined that the identifying descriptor substantially corresponds to the previously calculated identifying descriptor, the person or object captured within the image can be determined to be the same person or object that is included in the previous image.

BRIEF DESCRIPTION OF THE DRAWINGS

Exemplary embodiments are described in detail below with reference to the accompanying drawings in which:

FIGS. 8A-8C are exemplary diagrams illustrating the calculation of the shape and appearance context of an image;

DETAILED DESCRIPTION OF EMBODIMENTS

Exemplary embodiments of the broad principles outlined herein are described with reference to the various drawings.

Figure 1:
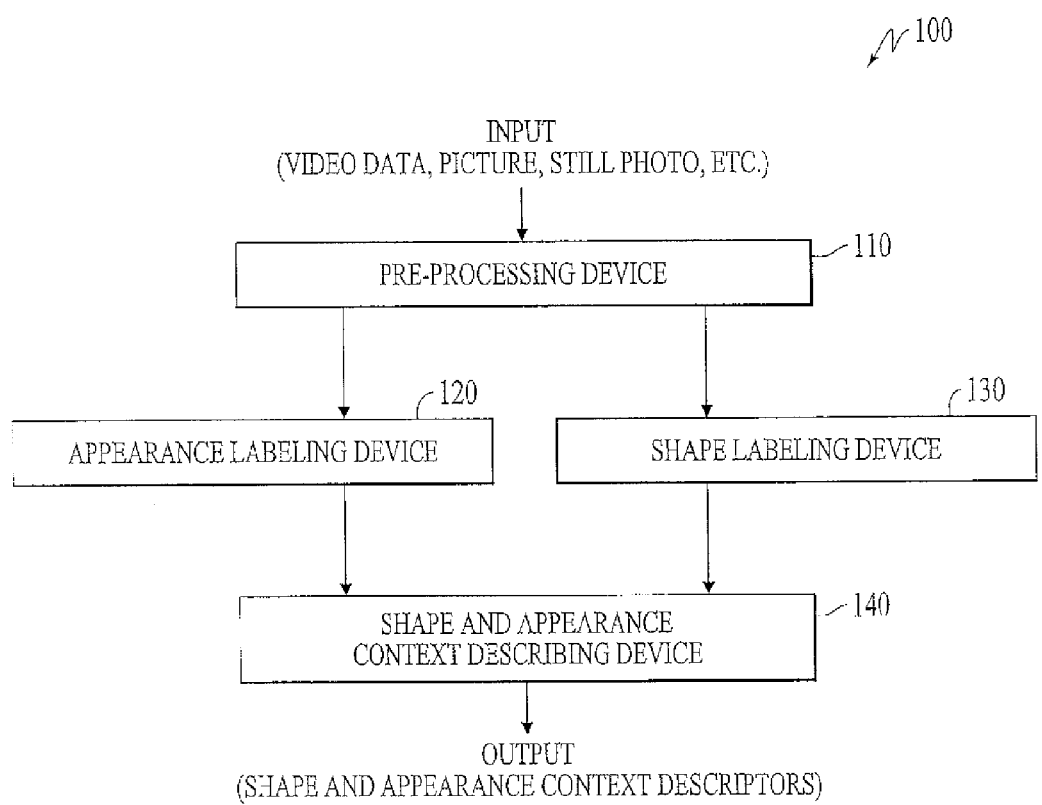
FIG. 1 is a block diagram of an exemplary device for determining shape and appearance context descriptor.

FIG. 1 shows a block diagram of an exemplary image processing device 100. The image processing device 100 can include pre-processing device 110, appearance labeling device 120, shape labeling device 130, and shape and appearance context describing device 140. During operation, the image processing device receives an input, such as an image captured by a camera, and processes the captured image to compute an identifying descriptor for a person or object that is included in the image. The identifying descriptor can later be used to re-identify the same person or object in a subsequently captured image.

The pre-processing device 110 can receive an input image, such as video images or still photos. From the input image, the pre-processing device 110 can identify image segments showing an individual person or object captured in the image. The pre-processing device 110 can perform additional processing, such as normalizing the size of the image or converting the data foiuiat, before transmitting the image data to both the appearance labeling device 120 and a shape labeling device 130.

The appearance labeling device 120 can create an appearance labeled image by assigning appearance labels to the image segments including the captured person or object. For example, the appearance labeling device 120 can assign appearance labels to each image segment by comparing appearance attributes that are calculated for each image segment with representative appearance attributes that are learned beforehand from a database of images. Once calculated, the appearance labeled image can be transmitted to the shape and appearance context describing device 140.

The shape labeling device 130 can create a shape labeled image by assigning shape labels to the image segments including the captured person or object. For example, the shape labeling device 130 can assign shape labels to each image segment by comparing shape attributes that are calculated for each image segment with representative shape attributes that are learned beforehand from a database of images. Once calculated, the shape labeled image can be transmitted to the shape and appearance context describing device 140.

The shape and appearance context describing device 140 can calculate an identifying descriptor that can be substantially unique to the person or object in the image, where the descriptor is based on information received from both the appearance labeled image created by the appearance labeling device 120 and the shape labeled image created by shape labeling device 130. The shape and appearance context describing device 140 outputs the descriptor, which may be stored and used, for example, to subsequently re-identify the person or object in later captured images.

An identifying descriptor that is calculated for the person or object can be compared with a previously calculated identifying descriptor, where the comparison can operate under control of a controller (not shown). If the identifying descriptor calculated for the person or object substantially corresponds to a previously calculated identifying descriptor, it can be determined that the person or object in the image is the same person or object that corresponds to the previously calculated identifying descriptor.

Figure 2:
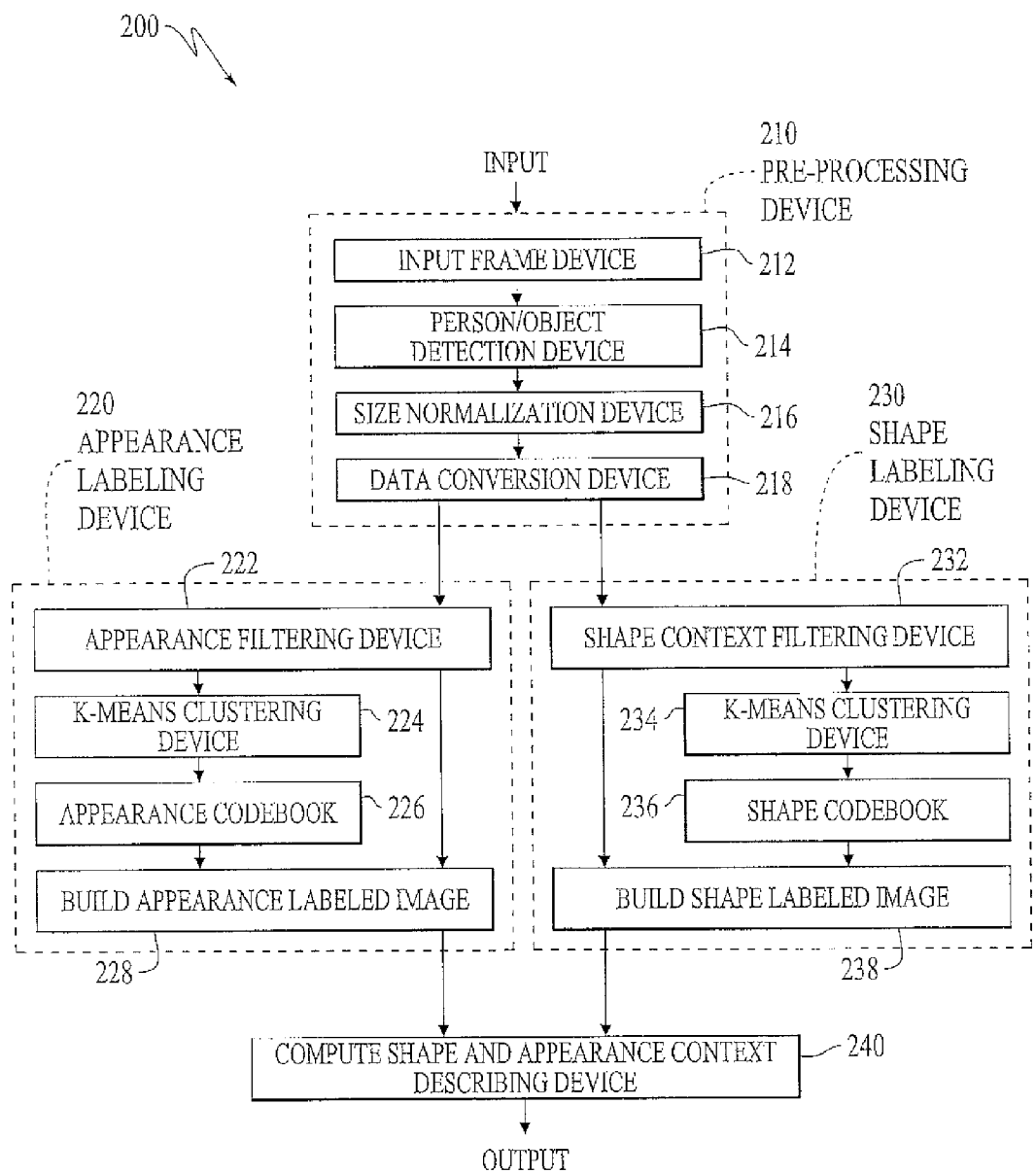
FIG. 2 is a more detailed block diagram of an exemplary device for determining a shape and appearance context descriptor in another embodiment.

FIG. 2 shows a more detailed block diagram of an exemplary image processing device 200. As shown, the image processing device 200 can include pre-processing device 210, appearance labeling device 220, shape labeling device 230 and shape and appearance context describing device 240.

The pre-processing device 210 can include an input frame device 212, a person/object detection device 214, a size normalization device 216, and a data conversion device 218. The pre-processing device 210 processes image data that is input from an image source, and transmits processed data to both of the appearance labeling device 220 and the shape labeling device 230.

The input frame device 212 can input video frames or still photographic images from one or more cameras into the image processing device 200.

The person/object detection device 214 can identify a portion of the image that is inputted from the input frame device 212 that captures persons or objects of a predetermined class, such as luggage, vehicles, packages, and the like. It should be understood that any suitable method for detecting persons or objects captured within the image may be used. For example, people may be detected using the approach described in N. Dalai and B. Triggs, "Histograms of the Oriented Gradients for Human Detection," CVPR, Vol. 1, pp. 886-893 (Jun. 20-25, 2005). The person/object detection device 214 may crop a portion of the inputted image that captures the detected person or object. The person/object detection 214 device can transmit the cropped image to size normalization device 216.

The size normalization device 216 can process the cropped image portion that captures the person or object so that the cropped image is normalized to a nominal dimension having a predetermined pixel width and pixel length. The cropped image portion can be normalized using any method. The size normalization device 216 can transmit the normalized image to data conversion device 218.

The data conversion device 218 can convert RGB pixel data in the normalized image into other color space data, such as Log-RGB color space data, Lab color space data, HSV data, or YIQ data to create a translated image. For example, the data conversion device 218 may convert the RGB pixel data for an image into Log-RGB data for subsequent processing in appearance labeling device 220. Additionally, the data conversion device 218 may convert the pixel data into Lab color space data for subsequent processing in shape labeling device 230. The data conversion device 218 outputs the translated image, including the converted data, to both the appearance labeling device 220 and the shape labeling device 230.

The appearance labeling device 220 can include an appearance filtering device 222, a K-means clustering device 224, an appearance codebook 226, and an appearance labeled image creating device 228. The appearance labeling device 220 processes data received from the pre-processing device 210 to create an appearance labeled image, and transmits the appearance labeled image to the shape and appearance context describing device 240.

The appearance filtering device 222 can calculate, from the converted data, an appearance attribute for each image segment capturing the person or object. The calculated appearance attribute may include, for example, a histogram of the oriented gradients (HOG) of each pixel. The calculation of HOG appearance attributes is described in greater detail below with reference to FIGS. 4A-4C. An appearance attribute is generally calculated for each pixel that captures the person or object, although larger image segments from the image may be used. Additionally appearance attributes may be calculated for all of the image segments that capture the person or object, or only some of the image segments that capture the person or object.

After processing the data in the appearance filtering device 222, an appearance labeled image can be created by assigning appearance labels to each image segment based on the appearance attribute calculated for each image segment in appearance filtering device 222. The appearance labels are assigned to each image segment in the appearance labeled image creating device 228 by comparing an appearance codebook 226 to the calculated appearance attributes of each image segment that are deteuuined in appearance filtering device 222.

The appearance codebook 226 can be created beforehand from a database of images depicting several persons or objects of a predetermined class, where the database images have also been processed with an appearance filtering device to calculate appearance attributes of image segments from the image database. For example, an image database containing several people may be processed to calculate an appearance attribute, such as HOG values, for each image segment that corresponds to a person in the database images. The database images are processed by the appearance filtering device 222 and the K-means clustering device 224 to build the appearance codebook 226.

The K-means clustering device 224 can process the appearance filtered database images to determine the most representative appearance attributes from the database images. The most representative appearance attributes can be determined from the appearance image database by K-means clustering. For example, K-means clustering of appearance filtered database images using a K-value of 50 will determine the 50 most representative appearance attributes in image segments that capture persons or objects of the predetermined class. The representative appearance attributes derived from the database images may be used as the appearance labels which include the appearance codebook 226. In this way, the appearance codebook 226 is learned before the newly inputted image is processed by the image processing device 200.

The K-means clustering is generally used during a preliminary phase to train the system with a dataset of training images containing, for example, a particular class of objects that is of interest. This builds the appearance codebook which is used in normal operation. Thus, referring to FIG. 2, during preliminary operation, the process proceeds from the appearance filtering device 222 through K-means clustering device 224 to build appearance codebook 226, and during normal operation the newly inputted image proceeds from the appearance filtering device 222 to the appearance labeled image creating device 228.

Thus, the appearance filtered data of the newly inputted image can be transmitted from appearance filtering device 222 to the appearance labeled image creating device 228. The appearance labeled image creating device 228 can compare the calculated appearance attributes from the new image to the appearance codebook 226 that is learned beforehand, to assign appearance labels to each image segment of the newly inputted image. To determine which appearance labels are assigned to each image segment, the output of the image filtering device 222, which is typically a vector, can be compared to all of the K vectors in the appearance codebook 226. The image segment can be assigned to the closest appearance codebook label vector. To determine the closest vector one could use an L1 or L2 norm, or any one of the "approximate nearest neighbor" techniques, such as kd-trees or metric trees. Any suitable method can be used to determine the closest appearance label for each image segment. The appearance labeled image creating device 228 builds an appearance labeled image including a label for each image segment capturing the person or object of the predetermined class. Generally, pixels having similar appearance attributes will be assigned the same appearance label.

The shape labeling device 230 can include a shape filtering device 232, a K-means clustering device 234, a shape codebook 236, and a shape labeled image creating device 238. The shape labeling device 230 processes image data received from the pre-processing device 210 to create a shape labeled image, and transmits the shape labeled image to the shape and appearance context describing device 240. The shape labeling device 230 may process data concurrently with the appearance labeling device 220.

The shape context filtering device 232 can calculate, from the converted data received from pre-processing device 210, a shape attribute for each image segment capturing the person or object. The calculated shape attribute represents a value that is characteristic of the shape of the portion of the person or object that is captured in each image segment. The shape attribute can include, for example, an aggregation of appearance attributes from surrounding image segments which can be characteristic of the shape of the image segment. A shape attribute is generally calculated for each pixel that captures the person or object, although larger image segments from the image may be used. Additionally, shape attributes may be calculated for all of the image segments that capture the person or object, or only some of the image segments that capture the person or object.

The shape codebook 236 is determined similarly to the appearance codebook 226 described above. That is, the shape codebook can be created from a shape image database including images capturing several persons or objects of a predetermined class, where the database images have also been processed with a shape filtering device to calculate shape attributes of relevant image segments from the image database.

The K-means clustering device 234 of the shape labeling device 230 processes the shape filtered database images to determine the most representative shape attributes from the shape image database. The most representative shape attributes can be determined by K-means clustering. For example, K-means clustering of shape filtered images using a "K" value of 20 will determine the 20 most representative shape attributes in image segments capturing persons or objects of the predetermined class. The representative shape attributes from the database images can be used as the shape labels which can include the shape codebook 236. Here also, the K-means clustering is used during preliminary operation to train the system with a data set of training images containing, for example, a particular class of objects that is of interest. This builds the shape codebook which is used in normal operation. Thus, referring to FIG. 2, during preliminary operation, the process proceeds from the shape filtering device 232 through K-means clustering device 234 to build shape codebook 236, and during normal operation the newly inputted image proceeds from the shape filtering device 232 to the shape labeled image creating device 238.

Thus, the shape filtered data of the newly inputted image can be transmitted from shape filtering device 232 to the shape labeled image creating device 238. The shape labeled image creating device 238 can compare the calculated shape attributes from the new image to the shape codebook 236 that can be learned beforehand, to assign shape labels to each image segment of the newly inputted image. The shape labels can be assigned to each image segment by any suitable method. Suitable techniques include, for example, the methods described above in connection with the appearance labels, or more preferably a Chi-squared distance. The shape labeled image creating device 238 builds a shape labeled image including a label for each image segment capturing the person or object of the predetermined class.

The shape and appearance context describing device 240 can calculate an identifying descriptor that is substantially unique to the person or object captured in the inputted image, where the descriptor is calculated based on information from both the appearance labeled image and the shape labeled image. The descriptor may represent the spatial distribution of the appearance labels over each of the shape labels.

As discussed above, the identifying descriptor can be used to re-identify a person or object in a system for purposes of for example, tracking the person or object in a video surveillance system. The identifying descriptor that is calculated for the person or object can be compared to one or more previously calculated identifying descriptors that are taken from persons or objects in previously input images. The identifying descriptor calculated for the person or object can be compared to a previously calculated identifying descriptor to see if the identifying descriptor substantially matches the previously calculated identifying descriptor, i.e., if the two descriptors are closer than a predetermined threshold. To determine whether an identifying descriptor matches a previously calculated descriptor, the L1 norm between the descriptors can be used. Thus, one can compute the L1 norm between the descriptor being considered and all the descriptors calculated from a given data set. The descriptors in the dataset can be sorted according to the distance between the descriptor being considered and the one in the data set. The descriptor at issue can be determined to substantially "match" the closest descriptor from the dataset if the distance between the descriptors is lower than a predetermined threshold. If the identifying descriptor is determined to substantially match the previously calculated identifying descriptor, the person or object can be re-identified as the same person or object in the previously input image.

Figure 3:
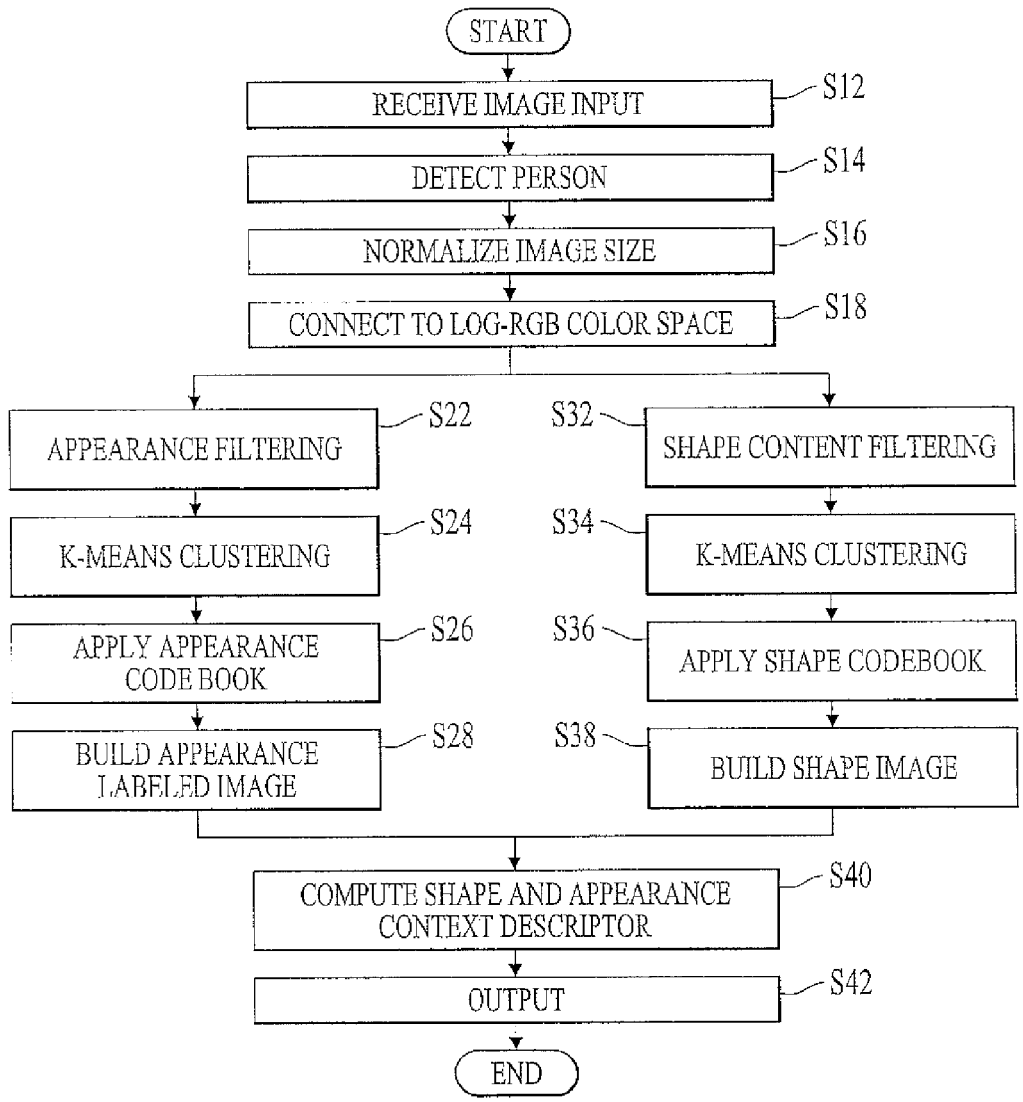
FIG. 3 is a flow chart illustrating an exemplary process for determining a shape and appearance context descriptor.

Referring to FIG. 3, during operation of an image processing device, the process can begin and proceed to step S12 where an image input can be received, and any person or object captured within the image can then be detected in step S14. The detected person or object can be isolated and normalized to a nominal size in step S16. The image data of the normalized image may then be converted to Log-RGB color space data or another data format in step S18 to create a translated image of the converted data format. The converted data can be transmitted to both the appearance labeling device 220 and the shape labeling device 230.

During operation of an appearance labeling device, the converted data can be filtered in step S22 to determine appearance attributes for each image segment including the captured person or object. The calculated appearance attributes can be used to build an appearance labeled image in step S28 by applying the calculated appearance attributes to an appearance codebook in step S26. The appearance codebook can be learned beforehand from performing K-means clustering on appearance filtered images from an appearance database in step S24, where the appearance image database can include images depicting persons or objects of a predetermined class. Representative appearance attributes from the image database can be calculated and used as appearance labels. The appearance labeling device can then transmit the appearance labeled image to a shape and context describing device.

During operation of a shape labeling device, the translated image, including the converted data, can be filtered to determine shape attributes for each image segment including the captured person or object in step S32. The calculated shape attributes can be used to build a shape labeled image in step S38 by applying the calculated shape attributes to a shape codebook in step S36. The shape codebook can be learned beforehand from performing K-means clustering on shape filtered images from a shape image database in step S34, where the shape image database can include images depicting persons or objects of a predetermined class. Representative shape attributes from the image database can be calculated and used as shape labels. As described above, the shape labeling device can transmit the shape labeled image to a shape and context describing device.

During operation of a shape and appearance context describing device, an identifying descriptor or signature for the person or object captured within the image can be computed at step S40 based on infoiniation from both the appearance labeled image input from the appearance labeling device and the shape labeled image input from the shape labeling device. The shape and appearance context describing device can output the descriptor in step S42 to a memory unit that can store the descriptor. The descriptor can be subsequently recalled from the memory unit and compared to a newly inputted image to later re-identify the person or object.

Figure 4C:
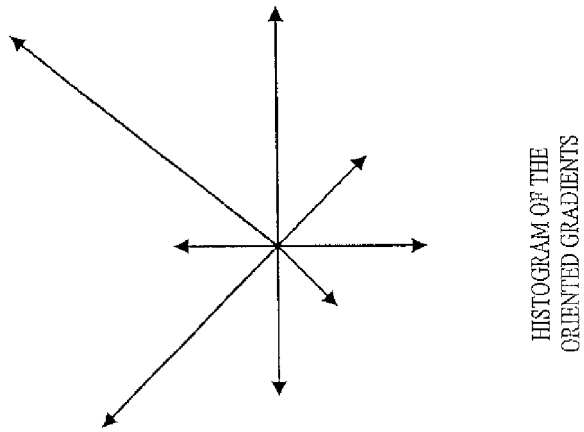
FIGS. 4A-4C are an image of a person and corresponding schematic diagrams illustrating the creation of Histogram Oriented Gradients (HOG) for each pixel in the image.
Figure 4B:
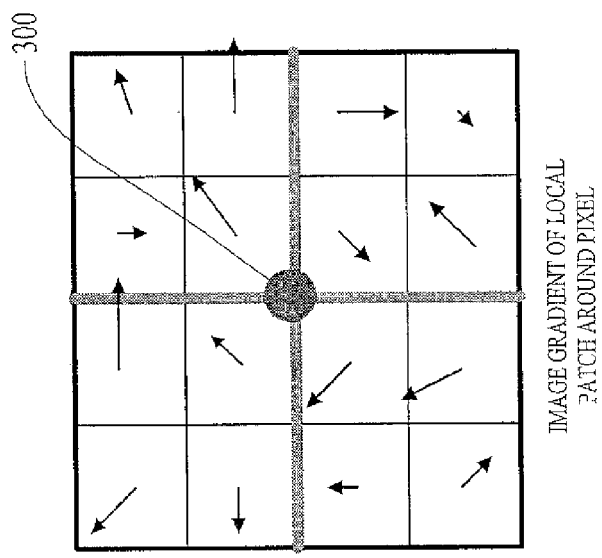
Figure 4A:
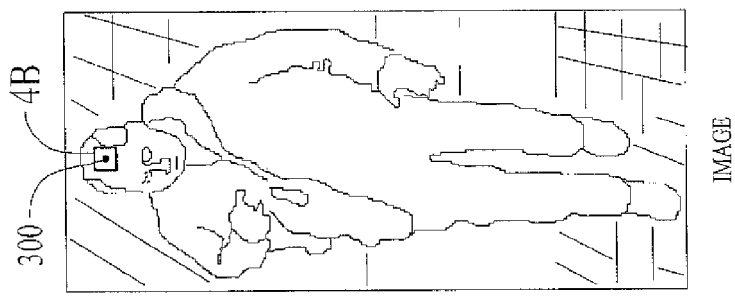

An exemplary operation of an appearance labeling device 220 in an exemplary embodiment is illustrated with reference to FIGS. 4 and 5. Specifically, FIGS. 4A-4C show the operation of an appearance filtering unit 222 in an embodiment where an appearance athibute is determined by calculating histograms of the oriented gradients (HOG) for each pixel capturing the person or object. A translated image (FIG. 4A) including converted Log-RGB color space data for each pixel is received from the data conversion device, and can be used to calculate the HOG value of pixel 300. FIG. 4B shows the image gradients of a local patch around pixel 300. The image gradient can be determined by taking the logarithm of each of the RGB channels, and computing a gradient of the logarithm of the channels. FIG. 4B illustrates a 4×4 local patch taken around pixel 300, but any patch dimension may be used. For example, a patch may be an N×N patch, where N is preferably in the range of from 2 to 25.

The gradient within each patch is quantized into a predetermined number of directions. FIG. 4B illustrates an image gradient that is quantized into 8 orientations, but any quantum of orientations can be used. For example, the gradient can be quantized into 4 to 28 directions.

The HOG for the pixel is determined by creating a histogram that sums the length of the gradient vector, and bins with respect to each of the quantized gradient orientations. For example, FIG. 4C is a graphical representation of a HOG for an image gradient quantized in 8 orientations. At a given pixel, the HOG value can be computed for each of the Log(R), Log(G) and Log(B) data. The HOG for each pixel is given by a concatenation of the three HOG's computed for each of the channels.

The appearance filtering device 222 can calculate an appearance attribute, such as HOG values for each pixel that captures the person or object. Alternatively, the HOG values can be calculated for only a portion of the pixels capturing the person or object, or HOG values can be calculated for image segments that are larger than one pixel.

The appearance labeled image creating device 228 creates the appearance labeled image by applying the appearance codebook 226 to assign a label to each HOG value calculated for each pixel. The labels are determined from a database of images including a plurality of persons or objects of a predetermined class. The database images can be processed as described above to calculate a HOG value for each pixel capturing the person or object. Representative HOG values are then calculated from the image database by using K-means clustering, as described above, so that there are K number of labels that can correspond to the centers of distribution of the representative HOG values calculated from the database images. Generally, representative appearance attributes can be calculated using a K value of greater than 10, preferably greater than 25, and more preferably in the range of from 50 and 100.

To create an appearance labeled image, the HOG calculated from the newly inputted image can be compared to the appearance codebook, and the closest appearance label can be assigned to each pixel based on the calculated HOG value of each pixel.

Figure 5:
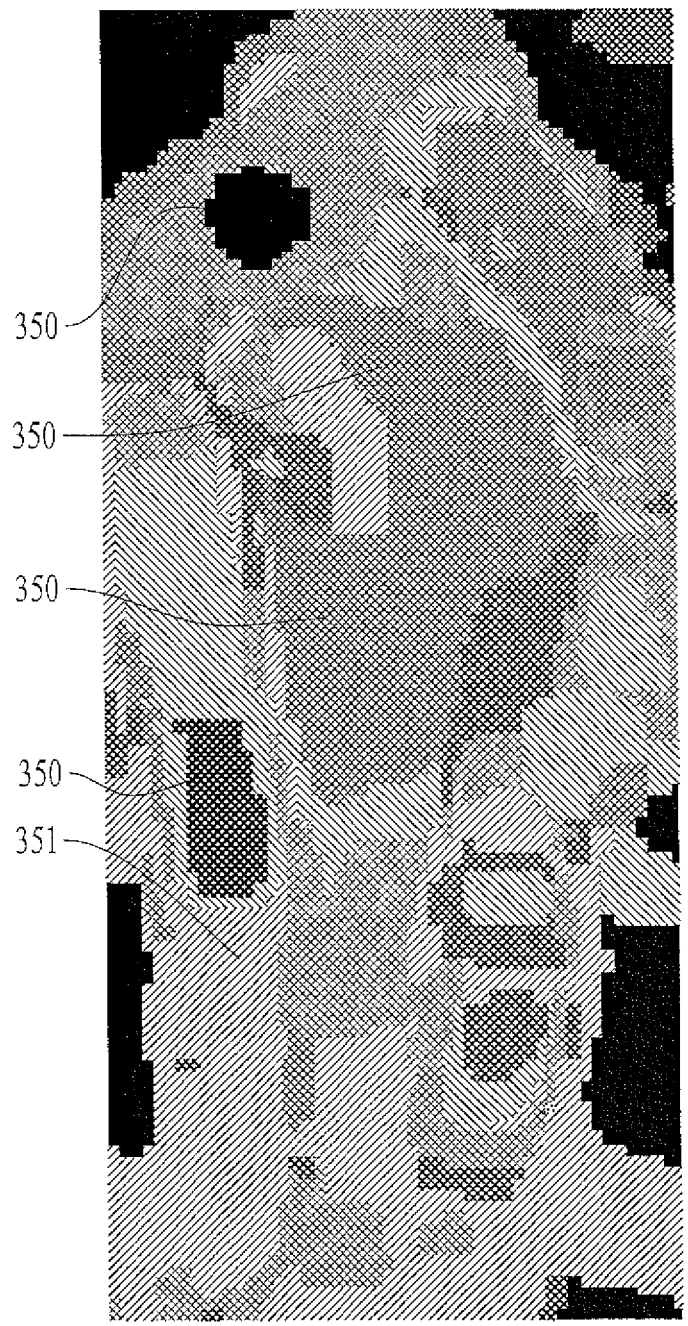
FIG. 5 is an exemplary graphical representation of an appearance labeled image.

A graphical representation of an appearance labeled image of a person is illustrated in FIG. 5, where each of the discrete regions 350 correspond to an appearance label. Because the appearance labels correspond to representative appearance attributes derived from database images, pixels having similar HOGs can have the same appearance label, even though the HOG values are not identical. For example, a pixel having a HOG value corresponding to a black appearance may be assigned the same appearance label as a pixel having a HOG value corresponding to a dark grey appearance depending, for example, on the number of appearance labels used. Thus, the pixels in region 351 may have similar HOG values, so that when the calculated HOG values of each pixel are applied to an appearance codebook, the pixels are all assigned the same appearance label which is graphically represented as region 351 in FIG. 5. Other groups of pixels that have similar HOG values can be assigned the same appearance label, which can produce an appearance labeled image that is partitioned into appearance labeled segments 350 as shown in FIG. 5. Neighboring pixels typically have similar appearance attributes, which can result in groups of adjacent pixels acquiring the same appearance label. However, each appearance label is generally assigned depending only on the appearance attribute of each pixel.

In one aspect, a histogram of the appearance labels over the entire image can be calculated directly from the from the appearance labeled image. In some embodiments, the histogram of the appearance labels can be used to identify the person or object captured in the image. The performance of the histogram of appearance labels as an identifying descriptor is discussed in greater detail below and illustrated in FIG. 13.

Figure 6:
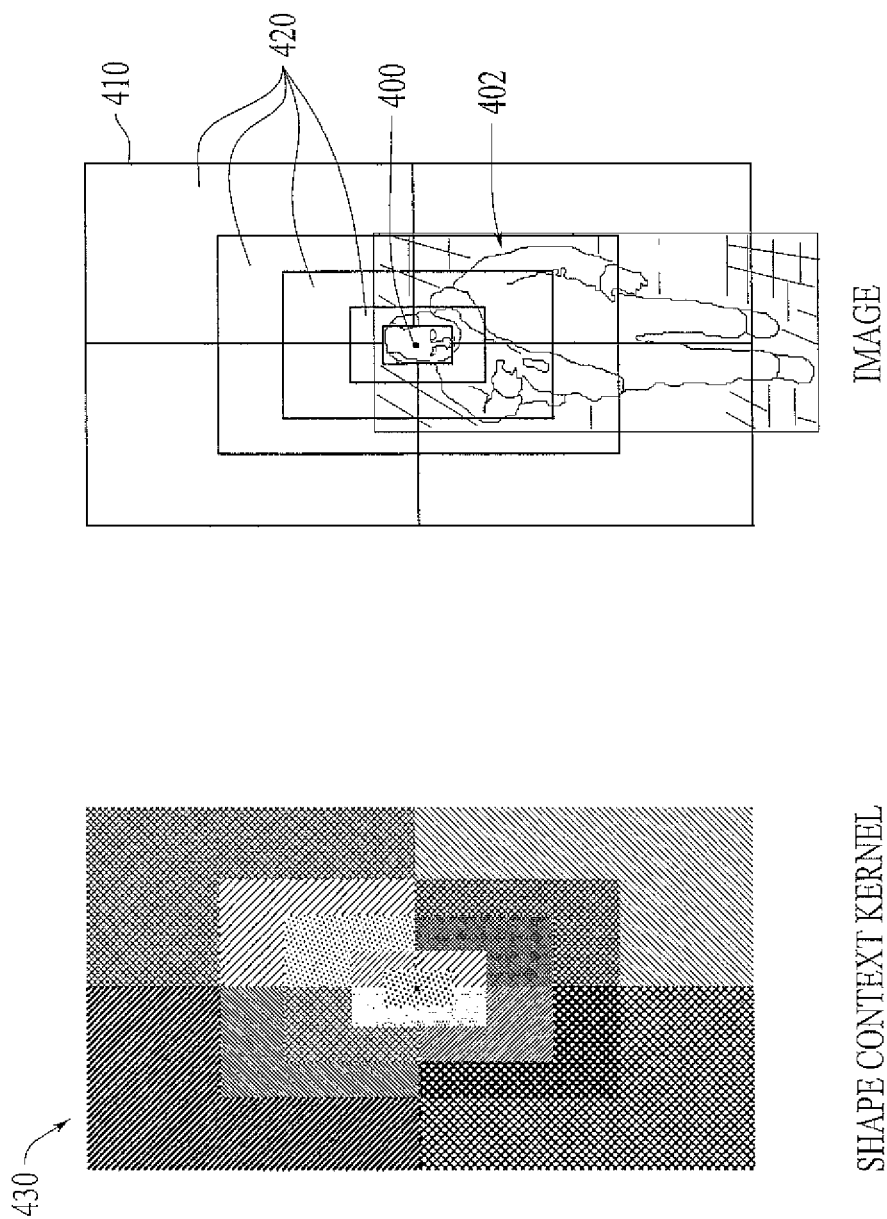
FIG. 6 is an exemplary diagram illustrating an image of a person and the creation of a shape context kernel for a pixel in the image.
Figure 7:
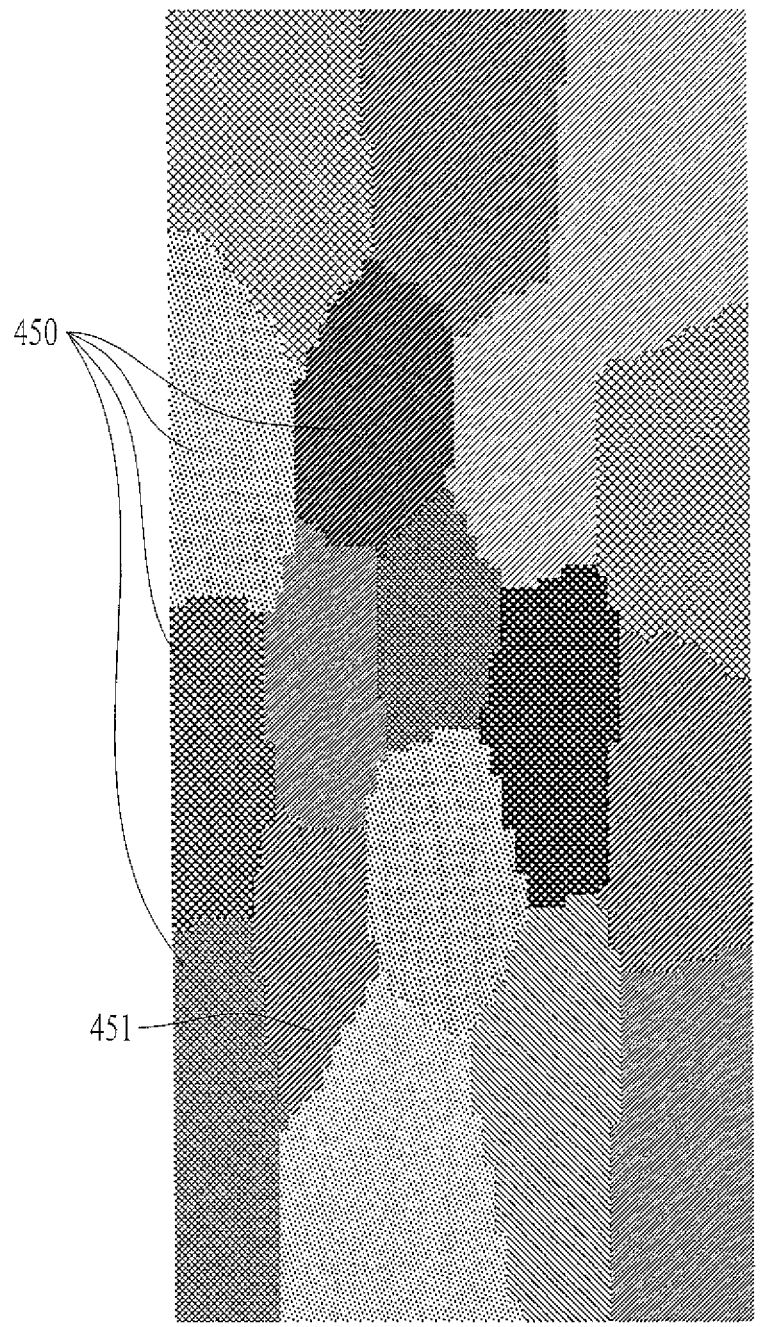
FIG. 7 is an exemplary graphical representation of a shape labeled image.

An exemplary operation of a shape labeling device is illustrated in FIGS. 6 and 7. The operation of a shape labeling device is analogous to the operation of an appearance labeling device, in that a shape attribute is calculated for each pixel capturing the person or object, and the shape attribute is compared to a shape codebook to assign shape labels to each pixel. However, the calculation of shape attributes differs from the calculation of appearance attributes because the shape attribute is characteristic of the shape of the person/object part captured in the pixel, rather than its appearance. For example, for an image capturing a person, an appearance label may generally describe pixel color such as "black," and the shape label may describe whether a pixel is a "head" part or a "foot" part. However, there may not be a strict semantic correspondence to labels in the shape and appearance codebook. The shape attribute for a given pixel is generally determined by determining characteristics of regions surrounding the pixel.

Calculation of the shape attribute in an exemplary embodiment can be described as follows. A shape context filtering device can receive converted Lab color space data from a data conversion device, that can be used to calculate a shape attribute. To calculate the shape attribute for pixel 400 (FIG. 6) capturing person 402, a mask 410 is centered on pixel 400.

The mask 410 is partitioned into several discrete L-shaped regions 420. The mask 410 can include discrete regions of other shapes, and any number of discrete regions can be used. Generally a mask having from about 16 to 40 discrete regions is used. The mask can be sized to cover the entire image. To calculate a shape attribute of pixel 400, the HOG values (based on the Lab color space data) of each pixel in the L-shaped regions 420 are calculated. The shape context filtering device 232 calculates HOG values from the L-channel of Lab color space data. After calculating the HOG for each pixel in an L-shaped region, the shape context filtering device 232 can then calculate the mean of the HOG values over each discrete L-shaped region to create a shape context kernel 430. In the shape context kernel 430, each L-shaped region surrounding pixel 400 is represented as the mean of the HOGs for each pixel in the L-shaped region.

The shape attribute for pixel 400 is determined by calculating a concatenate or aggregate vector that represents the mean HOG values calculated for each L-shaped region in mask 410. A vector representing the shape attribute can be calculated for each pixel capturing the person or object. Neighboring pixels generally have similar shape attributes.

In the foregoing embodiment, the gradient of the L channel of Lab data is used to calculated all the HOG's corresponding to all the regions in the mask 410. In other approaches, a Canny edge detector may be used instead of the L-channel. Additionally, an approach using top-down silhouette fitting may be used.

A shape labeled image can be created by applying the shape codebook 236 to assign a shape label to the shape attribute calculated for each pixel. As with the appearance codebook, the shape codebook is determined from a database of images including a plurality of persons or objects of predetermined class. The database images can be processed as described above in connection with FIG. 6 to calculate a shape attribute for each pixel capturing the person or object. Representative shape attributes are then calculated from the image database by using K-means clustering so that there are K number of labels that can correspond to the centers of distribution of the representative shape attributes calculated from the database images. The representative shape attributes may be calculated from the database images using a K value of greater than 5, and preferably in the range of from about 10 to 50.

Generally, a shape codebook is used that has fewer labels than the appearance codebook. For example, where a K value of from about 60 to 70 may be preferred to determine the appearance codebook, a K value of from about 15 to 25 may be preferred to determine the shape codebook.

To create the shape labeled image, the shape attribute calculated from the newly inputted image can be compared to the shape codebook, and the closest shape label can be assigned to each pixel based on the calculated shape attribute of each pixel. Because neighboring pixels generally have similar shape attributes, when the shape codebook is applied to the image, the image can be segmented piecewise into regions into regions that generally correspond to the same region/part of the person or object of interest. For example, pixels that capture the knee of a person may all be identified with the same shape label.

A graphical representation of a shape labeled image of a person is illustrated in FIG. 7, where each of the discrete regions 450 corresponds to a shape label. Because the shape labels correspond to representative shape attributes that are derived from database images, pixels having similar shape context vectors (or concatenates) can have the same shape label even through the shape attribute is not identical. For example, if the pixel in region 451 captures a knee of the person in the image, the pixels may have shape context vectors that are characteristic of a knee-shape. Thus, while the shape context vector of each pixel in region 451 will not be identical, when the shape context vector of each pixel is applied to the shape codebook, all of the pixels in region 451 may be assigned a shape label which is generally representative of a knee-shape. Thus, groups of pixels that have similar shape context vectors can be assigned the same shape label which can produce a shape labeled image including a plurality of discrete shape-labeled regions 450 as shown in FIG. 7.

Partitioning the person or object into parts by using shape labels can compensate for misalignment induced by pose changes, viewpoint changes and bounding box imprecision.

Figure 9:
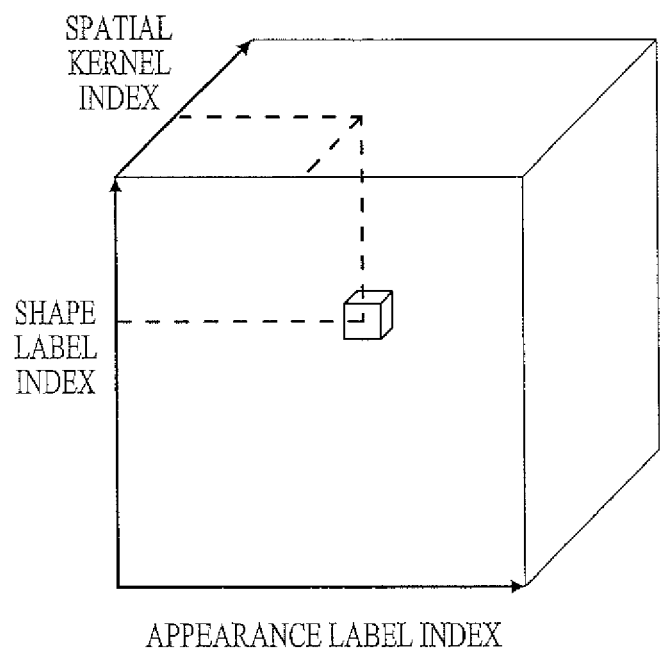
FIG. 9 is an exemplary diagram illustrating a matrix that represents a shape and appearance context descriptor of an image.

An exemplary operation of the shape and appearance context describing device 240 is illustrated in FIGS. 8 and 9. The shape and appearance context describing device 240 receives the appearance labeled image from the appearance labeled image creating device 228 and receives the shape labeled image from the shape labeled image creating device 238. The shape and context describing device can calculate an identifying descriptor for the person or object captured in the appearance labeled image and the shape labeled image by describing the spatial distribution of the appearance labels from the appearance labeled image over the shape labels from the shape labeled image. The identifying descriptor can describe the appearance of the person or object as seen by each part.

Specifically, for a given part in the shape labeled image, a part descriptor can be composed by the count of appearance labels found at a given distance in a given orientation, and for a number of distances and orientations. The identifying descriptor that is used to identify the person or object can represent a plurality of the part descriptors.

To calculate a part descriptor for part 540 in shape labeled image 525 (FIG. 8A), a mask 510 (FIG. 8B) can be placed over a pixel 500 in appearance labeled image 515. The mask 510 can include several discrete L-shaped regions 520. The mask in FIG. 8B is illustrated somewhat out of proportion, and generally can be sized to cover the entire image. Here also, the mask can include discrete regions of other shapes and any number of discrete regions may be used. A histogram of the appearance labels occurring in each L-shaped region that is placed over the appearance labeled image can be calculated to create spatial context kernel 530 (FIG. 8C) for pixel 500 in the appearance labeled image. For each pixel that has the same shape label as pixel 500, the spatial context kernel is computed. The spatial context kernel is then averaged so every L-shaped region will have an average histogram. The shape and appearance context for a given shape label can be represented by a concatenation of the average histograms of the L-shaped region for the pixels corresponding to part 540 in the shape labeled image.

Figure 13:
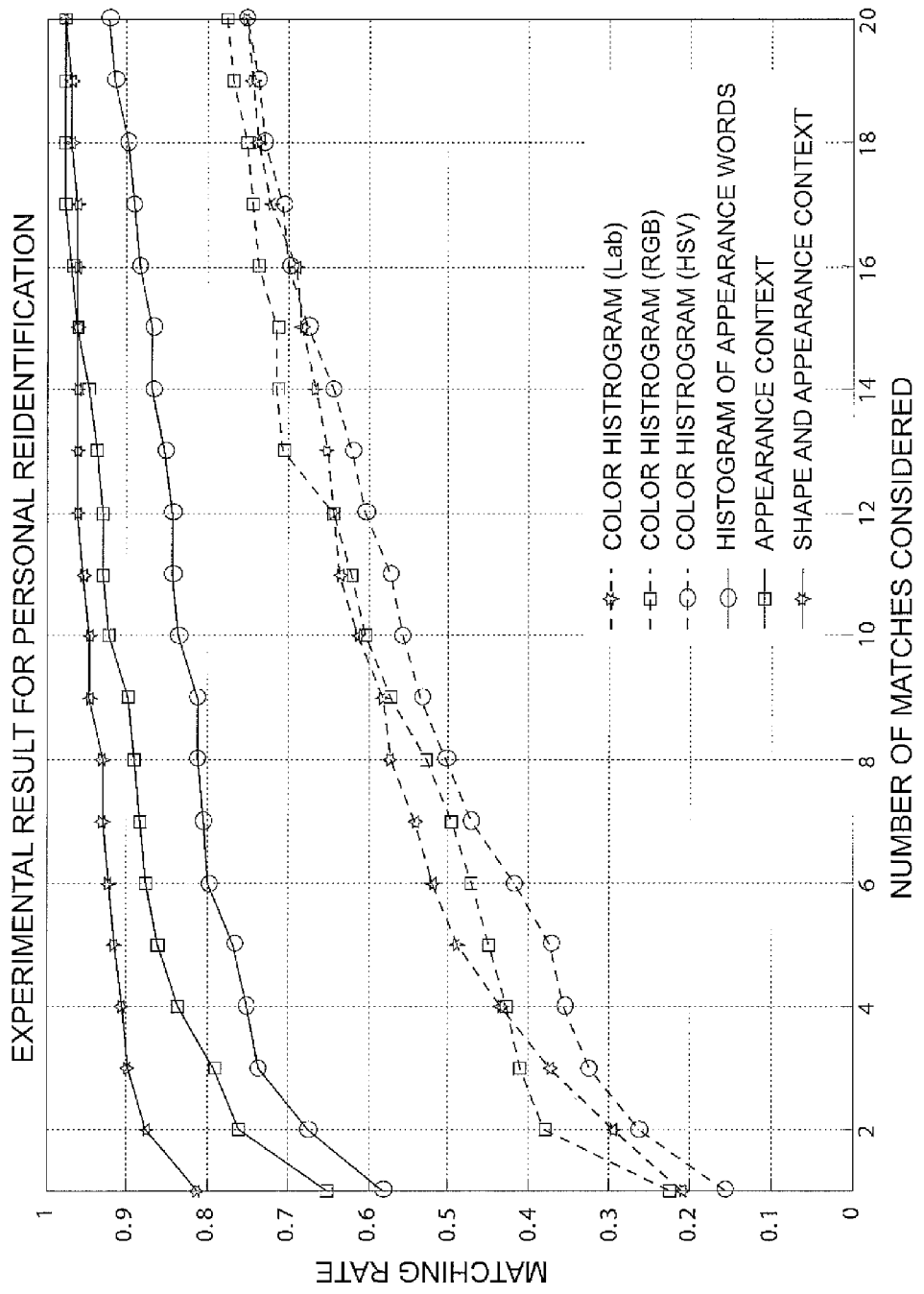
FIG. 13 is an exemplary graph illustrating matching rate using a shape and appearance context descriptor versus the detection rate of other methods.

In one aspect, an appearance context descriptor of the image can be calculated separately from the shape and appearance context by taking a concatenation of the average histograms from the L-shaped regions of the mask for all of the pixels in the appearance labeled image (without reference to the shape labeled image). The appearance context represents a distribution of appearance labels over the image, and may itself be used as an identifying descriptor for the person or object captured in the image. The performance of the appearance context as an identifying descriptor is illustrated in FIG. 13, which is discussed in greater detail below.

The use of L-shaped regions to calculate a spatial context enables the calculation of a descriptor that embeds the orientation of the count of appearance labels. Thus, in embodiments using an L-shaped region or similar orientation-dependent shape, the morphology of the mask makes the appearance context non-rotation invariant. This can be desirable in embodiments where the image processing device is configured to calculate descriptors identifying clothing appearance because the calculated descriptor readily distinguishes between a person wearing a white T-shirt and black pants, and a second person wearing a black T-shirt and white pants. In contrast, the descriptor may be made rotation invariant if a mask is used that includes partitions of concentric circular rings.

The shape and appearance context descriptor can be represented by the cube shown in FIG. 9 including a value for the appearance label index (x-axis), a value for the shape label index (y-axis), and a value for the spatial kernel index (z-axis). In this instance, the descriptor is a cubic matrix. If n is the number of shape labels, m is the number of appearance labels, and l is the number of kernel indices, then the descriptor is an m×n×l cubic matrix. The small cube highlighted in this figure represents a descriptor for a particular appearance label index, a particular shape label index, and a particular spatial kernel index. The entire cube represents the descriptor of the whole pair shape labeled image and appearance labeled image.

Figure 10:
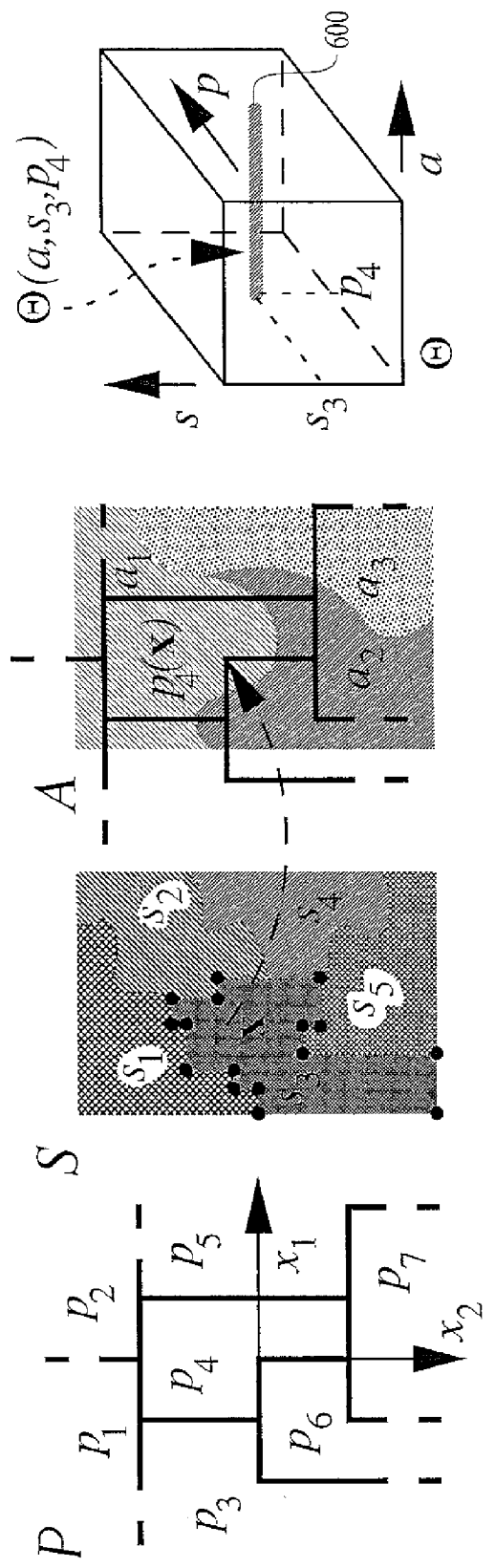
FIG. 10 is an exemplary diagram illustrating the calculation of a shape and appearance context descriptor of an image in another embodiment.
Figure 11:
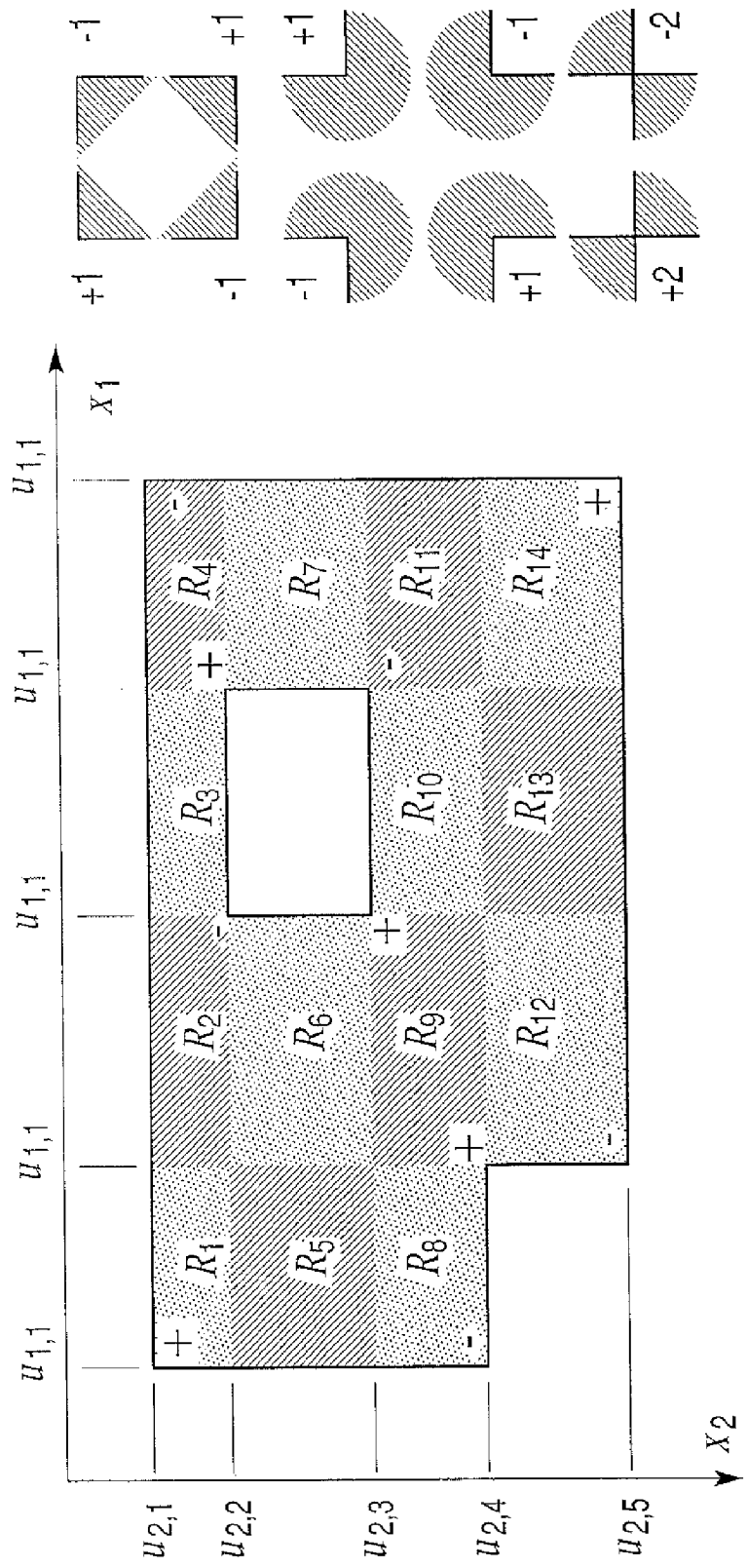
FIG. 11 is an exemplary diagram illustrating a simplified method for calculating image statistics over discrete regions of an image by classification of the corner types.
Figure 12:
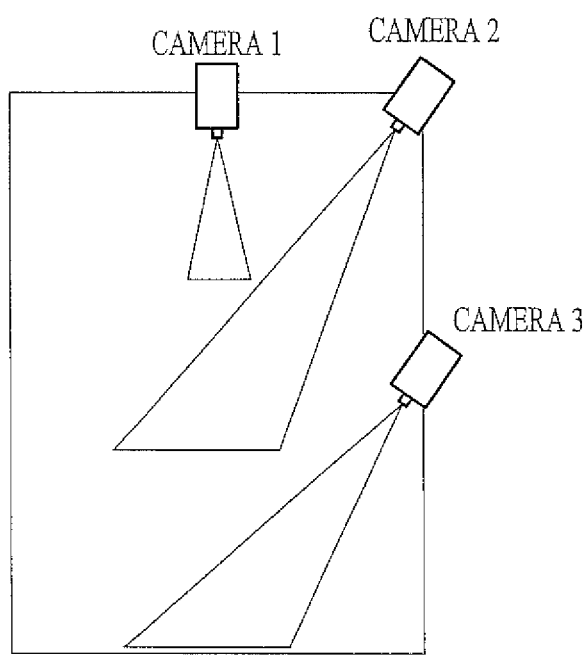
FIG. 12 is an exemplary diagram representing the layout of cameras used to collect experimental data, and representative samples of frames for three individuals from each camera view.
Figure 12:
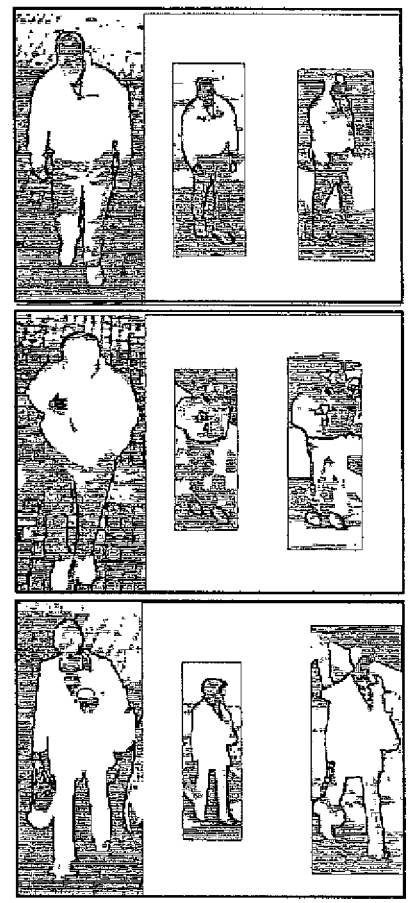

FIGS. 10-12 illustrate a detailed calculation of an identifying descriptor from an appearance labeled image and a shape labeled image. In FIG. 10, P represents a mask including partitions $p_1$-$p_l$. The mask P is placed over appearance labeled image A having appearance labels $a_1$-$a_m$. As shown, S represents a shape labeled image with labels $s_1$-$s_n$, and $\Theta$ (a, s, p) represents the part of the descriptor corresponding to the particular appearance label a, the particular shape label s, and the particular L-shaped region p. $\Theta$ represents the overall shape and context descriptor used to identify the person or object captured in image I.

If image I contains the person or object of a given class, A can be its appearance labeled image, and S (defined over Λ) can be its shape labeled image, where pixel labels are meant to identify regions of image I occupied by specific parts of the object. The descriptor Θ may be determined as follows. S:Λ→S and A:Λ→A are two functions defined on a discrete domain Λ of dimensions M×N, and assuming values in the label sets S={$s_1, \ldots, s_n$} and A={$a_1, \ldots, a_m$} respectively. Also, P={$p_1, \ldots, p_l$} is a partition such that $\cup_i p_i$ represents the plane, and $p_i \cap p_j = 0$, if i≠j. If p∈P and x a point on the plane x,p(x) can be defined p(x)={x+y|y∈p}, and h(a, p(x))=P[A (y)=a|y∈p(x)] can represent the probability distribution of the labels of A over the region p(x), where P is a probability measure.

In other words, for a given A, and a randomly selected point y∈p(x), the probability that the label at that point will be a is given by h(a, p(x)). For example, in FIG. 10, if h(a, $p_4$(x)) is the normalized count of the labels of A in $p_4$(x), which represents the probability distribution of labels A over the region p(x), then by averaging h(a, $p_4$(x)) over all x∈{y|S(y)= $s_3$}=$D_{s3}$, Θ (a, $s_3$, $p_4$) can be obtained, which is line 600 in FIG. 10.

Also, if $D_s$={x|S(x)=s}, s∈S, the occurrence function can be defined as follows. The occurrence function Θ: A×S× P→$R_+$ can be defined such that point (a, s, p) maps to $$\Theta(a, s, p) = E[h(a, p(x)) | D_s] = \frac{1}{D_s} \int_{D_s} h(a, p(x)) dx \quad (1)$$

If x is a uniformly distributed random variable, E[·|D] denotes the statistical expectation where x is constrained to assume values in D. For example, the computation of the mean and covariance can describe the notation of expectation E[.|.].

Θ computed over S and A is an m×n×l matrix. Θ can be a collection of values corresponding to all the points of the domain A×S×P which is referred to sometimes herein as the occurrence matrix. The occurrence matrix can be used as a unique identifying descriptor for each part or domain $D_s$ because, given S and A, for a randomly selected point x∈$D_s$, the probability distribution of the labels A over the region p(x) of A can be represented by Θ(s, p).

The computation of the occurrence matrix can be simplified by using integral computations to compute image statistics over domains. Integral computations can be used to calculated integral image representations and integral histogram representations, as described respectively in P. Viola and M. J. Jones, "Robust Real-Time Face Detection," IJCV, vol. 57, pages 137-154 (2004), and F. Porikli, "Integral Histogram: a Fast Way to Extract Histograms in Cartesian Spaces," CVPR, vol. 1, pp. 829-836 (Jun. 20-25, 2005), for example. Integral computations can be described as follows:

For a function $f(x): R^k \to R^m$, and a rectangular domain D=[$u_1, v_1$]×...×[$u_k, v_k$]⊂$R^k$, if there exists an antiderivative F(x): $R^k \to R^m$ of f(x), then $$\int_D f(x) dx = \sum_{v \in B^k} (-1)^{v^T 1} F(v_1 u_1 + \bar{v}_1 v_1, \ldots, v_k u_k + \bar{v}_k v_k), \quad (2)$$

where v=($v_1, \ldots v_k)^T$, $v^T 1 = v_1 + \ldots + v_k$, $\bar{v}_i = 1 - v_i$, and B={0,1}. If k=1, then $$\int_D f(x) dx = F(v_1) - F(u_1),$$

which is the Fundamental Theorem of Calculus. If k=2, then $$\int_D f(x) dx = F(v_1, v_2) - F(v_1, u_2) - F(u_1, v_2) + F(u_1, u_2),$$

and so on.

Equation (2) represents the class of operations called integral computations.

By using integral computations, image statistics can be calculated over non-simply connected rectangular domains (referred to herein as "generalized rectangular domains") from a cumulative image representation. This method enables designing fast, more flexible and sophisticated region features such as those used to calculate the shape and appearance context descriptor. Briefly, Equation (2) can be generalized to domains defined as follows.

D⊂$R^k$ can be a generalized rectangular domain where the boundary ∂D is made of a collection of portions of a finite number of hyperplanes perpendicular to one of the axes of $R^k$. If ∇·D indicates the set of corners of a generalized rectangular domain D, then $$\int_D f(x) dx = \sum_{x \in \nabla D} \alpha_D(x) F(x), \quad (3)$$

where $\alpha_D$: $R^k \to Z$, is a map that depends on k. For k=2, $\alpha_D(x) \in \{0, \pm 1, \pm 2\}$, according to the which of the types of corners x belongs to. Thus if D is a generalized rectangular domain, one can still compute the integral of f(x) over D in constant time. This can be done by summing up the values of F(x), computed at the corners x∈∇·D, and multiplied by $\alpha_D(x)$, which depends on the type of corner. For a planar case, the types of corners can be depicted in FIG. 11. FIG. 11 illustrates a generalized rectangular domain D partitioned into simple rectangular domains {$R_i$}. The right side of FIG. 11 illustrates function $\alpha_D(x)$, which assumes values different from 0 only if x is a corner of D. The specific value depends on the type of corner. For the planar case, there are 10 types of corners depicted in FIG. 11, along with the corresponding values of $\alpha_D$. Therefore, for any discrete domain D, one can compute statistics over D in constant time simply by inspecting the corners to evaluate $\alpha_D$.

The calculation of the occurrence function (1) can be computed over a discrete domain Λ, where every possible subdomain is a discrete generalized rectangular domain.

The occurrence function (1) is equal to:

$$\Theta(a, s, p) = |D_s|^{-1} |p|^{-1} \sum_{x \in \nabla \cdot D_s, y \in \nabla \cdot p} \alpha_{D_s}(x) \alpha_p(y) G(a, x+y), \quad (4)$$

where, $$G(\cdot, x) = \int_{-\infty}^{x} \int_{-\infty}^{u} e \circ A(v) dv du,$$

and e: A→$N^m$ is such that a label $\alpha_i \in A$ is mapped to $e_i$, where $e_i$ is the unit vector with only the i-th component different then 0, and therefore, the inner integral is the integral histogram of A. Note that a∈A is intended to index one of the elements of the m-dimensional vector G(·, x).

Based on equation (4), the occurrence matrix can be calculated with Algorithm 1, below:

---

Algorithm 1: Fast occurrence computation

Data: Functions A and S
Result: Occurrence matrix Θ
1 begin
2   | Use (7) to compute G from a single pass inspection of A
    | // Compute |$D_s$| $\alpha_{D_s}$ and ∇·$D_s$ -continued Algorithm 1: Fast occurrence computation

```
 3  |  foreach x ∈ Λ do
 4  |  |   |D_{S(x)}| ← |D_{S(x)}| + 1
 5  |  |   if IsCorner (x) then
 6  |  |   |  Set α_{DS(x)}(x)
 7  |  |   |  ∇ · D_{S(x)} ← ∇ · D_{S(x)} U{x}
    |  |
    |  // Use (6) to compute ⊖
    |  // |p| α_p and ∇ · p known a priori
 8  |  foreach s ∈ S do
 9  |  |   foreach p ∈ P do
10  |  |   |   foreach x ∈ ∇ · D_s do
11  |  |   |   |   foreach y ∈ ∇ · p do
12  |  |   |   |   |   ⊖(·,s,p) ← ⊖(·,s,p)+
13  |  |   |   |   |         α_{D_s}(x)α_p(y)G(·, x + y)
    |  |   |   |
14  |  |   |   ⊖(·,s,p) ← |D_s|^{-1}|p|^{-1}⊖(·,s,p)
    |  |
15  |  return ⊖
16  end
```

A data set was generated using samples of data from 44 different individuals recorded from 3 different, non-overlapping, camera viewpoints.

FIG. 12 illustrates 3 samples of three individuals viewed from 3 different cameras. An appearance labeled image and shape labeled image is created for each individual a shape and appearance context descriptor is calculated.

To the data set, new images of 99 individuals were added which were recorded from similar viewpoints. Every person in each view is represented by two to four images, of about 80×170 pixels in size. In a video-surveillance system such images would be cropped out of the full frames by a person detector, or tracker module.

To build the appearance and shape codebooks 30% of the images of the individuals were randomly selected.

FIG. 13 compares the matching performance of several approaches. The results indicate that the shape and appearance context is the best performing algorithm. Further, approaches that capture the spatial relationships among appearance labels, such as the appearance context, significantly outperform the approaches that do not, such as bag-of-features approaches.

The image processing device and method perform remarkably well in both specific object recognition and object category recognition tasks. The descriptors calculated using the techniques and principles described above can be distinctive and robust to occlusions, illumination and viewpoint variations. For example, the present disclosure enables a system that accurately identifies people for same-day tracking based only on the appearance of their clothing. Additionally, because the computation cost of computing the descriptors can be low, the descriptors can be computed in real-time, enabling identification of targets in video surveillance.

The principles described above provide the ability to match the identity of a person or object seen from one video camera to the identity of the same person or object seen from possibly another camera and possibly another time. Thus, the a person or object can be tracked through a an environment that includes a network of cameras. The re-identification system described herein can be robust, fast, and deliver a high matching rate.

While the disclosed methods and systems have been described in conjunction with exemplary embodiments, these embodiments should be viewed as illustrative, not limiting. It should be understood that various modifications, substitutes, or the like are possible within the spirit and scope of the disclosed devices, methods and systems.

What is claimed is:

1. A method for processing an image including a person or object that had been identified in the image, the method including:
   identifying in a pre-processing processor a plurality of image segments that divide the person or object into portions that capture the person or object;
   converting data from the image segments into Log-RGB color space data;
   calculating a histogram of the oriented gradients (HOG) of each image segment based on the Log-RGB color space data; and
   creating an appearance labeled image in an appearance labeling processor by assigning appearance labels to the image segments based on the calculated HOG of each image segment, where the appearance labels correspond to representative HOG values predetermined from an appearance image database.

2. The method according to claim 1, further including calculating an identifying descriptor for the person or object captured in the image based on a histogram of the appearance labels over the image.

3. A method for processing an image including a person or object that had been identified in the image, the method including:
   identifying in a pre-processing processor a plurality of image segments that divide the person or object in the image into portions that capture the person or object;
   converting data from the image segments into Log-RGB color space data;
   calculating a histogram of the oriented gradients (HOG) of each image segment based on the Log-RGB color space data; and
   creating an appearance labeled image in an appearance labeling processor by assigning appearance labels to the image segments based on the calculated HOG of each image segment, where the appearance labels correspond to representative HOG values predetermined from an appearance image database, wherein the HOG is calculated for an N ×N patch of pixels within an image segment and N is between about 2 to 25.

4. The method of claim 3, wherein a gradient within each patch is quantized into about 4 to 28 directions.

5. The method of claim 3, wherein a gradient within each patch is quantized into about 8 directions.

6. A method for processing an image including a person or object that had been identified in the image, the method including:
   identifying in a pre-processing processor a plurality of image segments that are included as part of the person or object in the image;
   converting data from the image segments into Log-RGB color space data;
   calculating a histogram of the oriented gradients (HOG) of each image segment based on the Log-RGB color space data;
   creating an appearance labeled image in an appearance labeling processor by assigning appearance labels to the image segments based on the calculated HOG of each image segment, where the appearance labels correspond to representative HOG values predetermined from an appearance image database;
   placing a mask having a plurality of discrete regions over the plurality of image segments of the person or object;

generating a histogram of appearance labels occurring in each discrete region of the mask;

generating an average histogram by averaging histograms of appearance labels in each discrete region of the mask; and concatenating average histograms of discrete regions of the mask to form an identifying descriptor.

7. The method of claim 6, wherein each of the discrete regions of the mask has an orientation-dependent shape.

8. The method of claim 6, wherein each of the discrete regions of the mask has an L-shape.

* * * * *